INVENTOR.
Earl T. Pankonin
Torsten Sandvik
BY
Pendleton, Neuman,
Seibold & Williams
Attys.

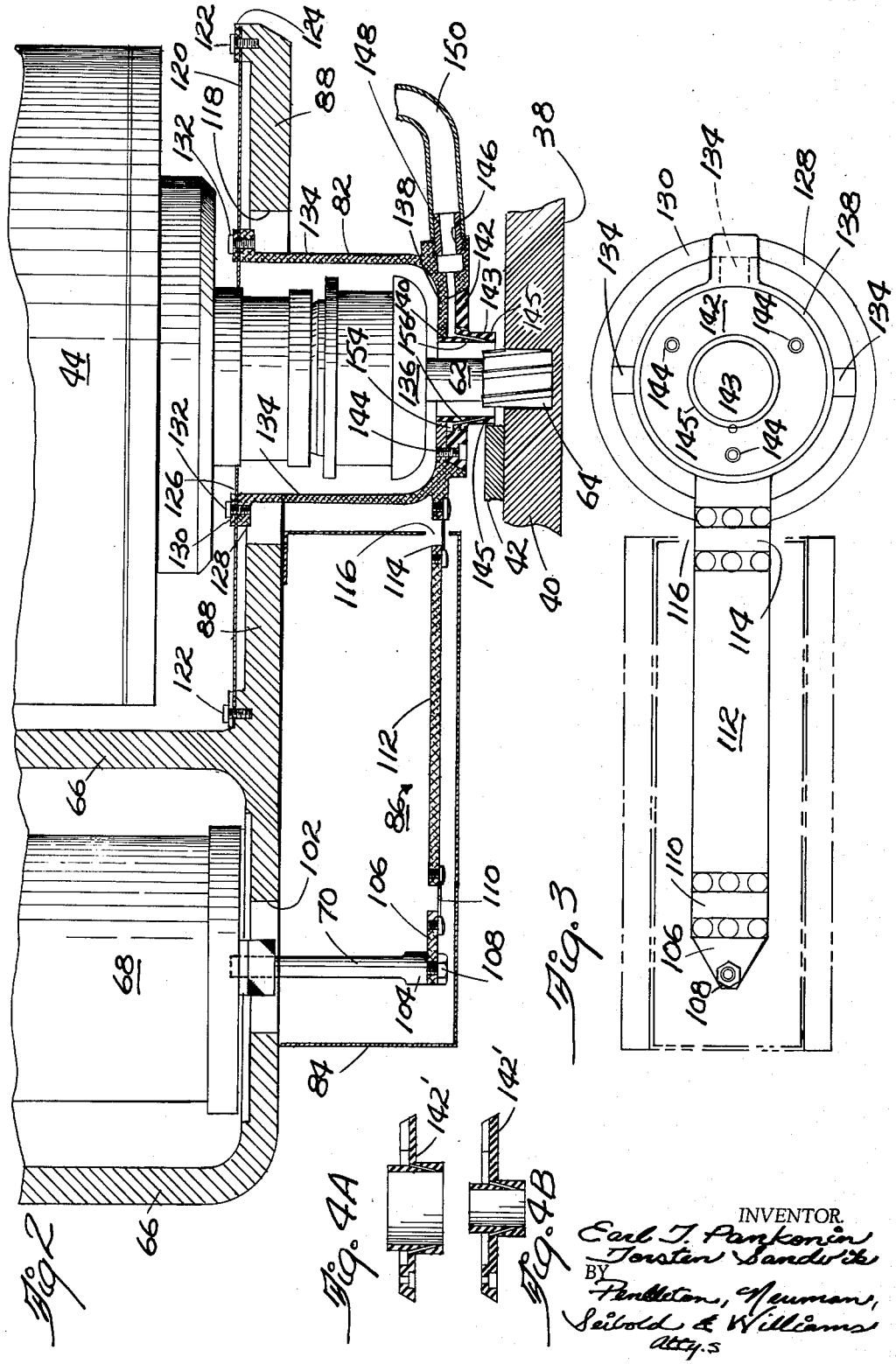

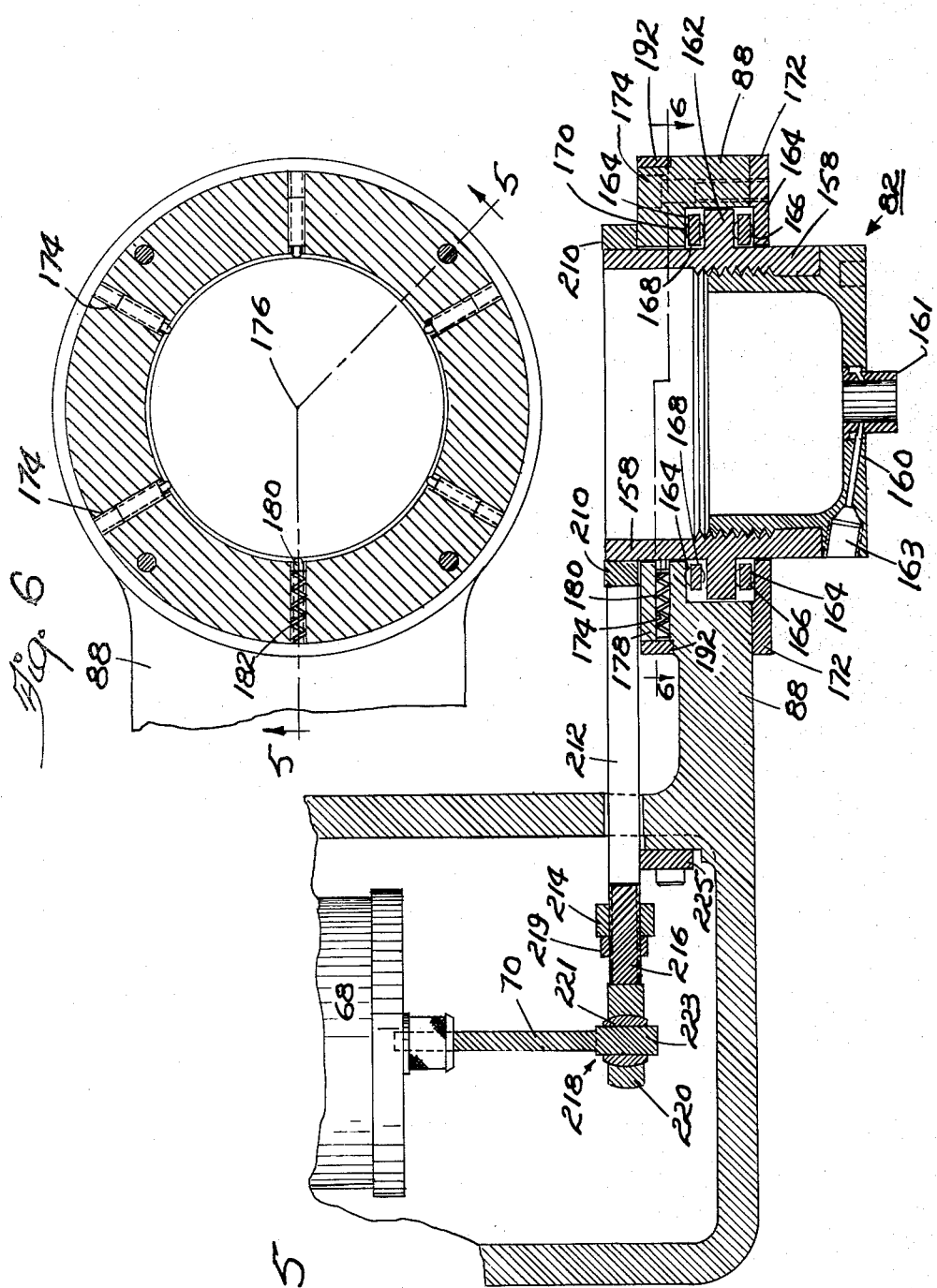

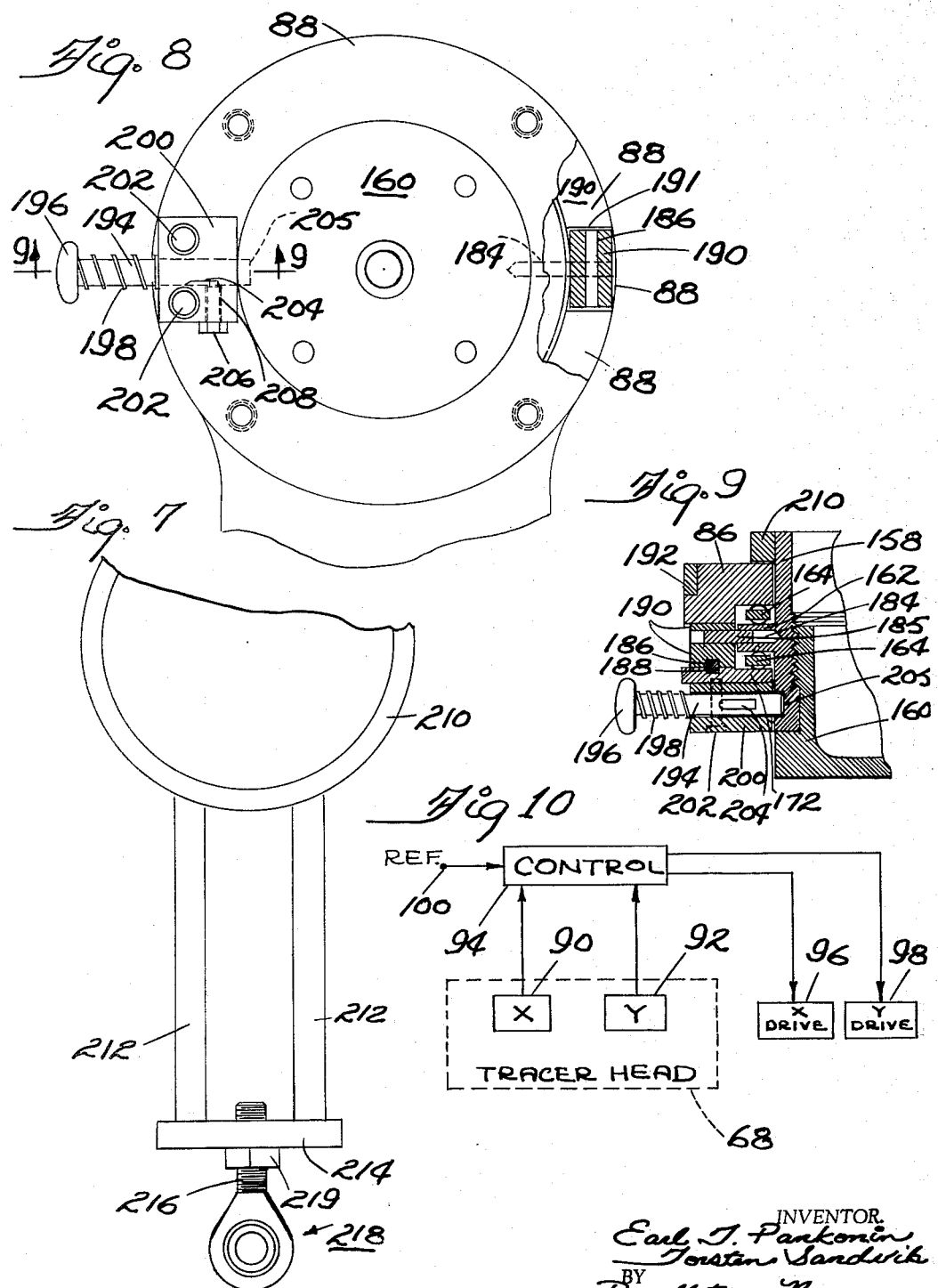

United States Patent Office 3,245,321
Patented Apr. 12, 1966

3,245,321
PROFILING MACHINE
Earl T. Pankonin, Elmwood Park, and Torsten Sandvik, Niles, Ill., assignors to Onsrud Machine Works, Inc., Niles, Ill., a corporation of Illinois
Filed June 14, 1963, Ser. No. 287,875
14 Claims. (Cl. 90—13.5)

This invention relates to automatic power operated machine tools and more particularly to power operated milling or routing machines adapted to remove metal from the surface of a work piece in accordance with the contour of a pattern or template.

The most common embodiments of prior art profiling machines employ a template mounted on a portion of the machine bed spaced from the work, and a follower urged against the periphery of the template. The follower is connected to a power operated drive mechanism to cause movement of the cutting tool with respect to the work in accordance with the template contour. The disadvantage of this type of machine is that a substantial portion of the machine bed is taken up with the template and is therefore not available to support a work piece. Accordingly, the maximum size work piece which can be accommodated by such a machine is limited to half of the area of the machine bed.

Other devices of the prior art have attempted to overcome the poor utilization of bed space involved in placing the template directly on the machine bed, by supporting the template on a second surface removed from the bed. This type of construction involves the use of a relatively long and expensive linkage, however, to interconnect the follower to the servo units which control the machine tracking in accordance with the relative movement of the follower. In such linkages, even a small deflection or distortion over an appreciable length tends to promote inaccurate operation.

Still other prior art devices attempted to simplify the linkage between the follower and the cutting head by supporting the template on a second surface, parallel to the bed located over the machine in a position directly over the work piece. A follower cooperating with the periphery of the template is aligned with the motor driven shaft upon which the cutting tool is mounted. This type of construction, however, makes for a relatively bulky machine, and it is a rather laborious and difficult process to change the templates when a different pattern is desired to be cut into the work piece, since the template surface is relatively inaccessible at the top of the machine.

In still another type of prior art profiling machine, the follower is supported in fixed relation to the spindle of the cutting tool, and the cutting tool is moved in relation to the work by manually forcing it in the desired direction, the cutting tool being limited in its movement by the follower bearing against a template mounted directly on the work piece. This construction eliminates most of the problems inherent in other prior art devices involved in the utilization of bed space, and in the accuracy of the linkage mechanism. No bed space is wasted, because the template is mounted directly on the work, and no linkage is necessary since the cutting tool and follower are in fixed relation to each other. The disadvantage of this type of machine is that the force moving the cutting tool through the work originates entirely with the operator, which limits the speed with which the cutting tool may be moved relative to the work. The manual operation of this type of router also causes unwanted variations in quality due to errors in judgment committed by the operator in moving the follower out of contact with the template.

The present invention overcomes the disadvantages of prior art profiling machines by providing a machine in which the template directly overlies the work piece on the machine bed, and the follower is connected in resilient relation to the spindle. The linkage between the follower and the tracer head is short and simple, minimizing errors due to thermal expansion and contraction, backlash, and vibration. The present invention thus permits work to be performed with a maximum of utilization of bed space, while also providing for power operated means for causing the cutting head to traverse the work, in response to electrical signals produced in accordance with movement of a linkage connected to the follower.

Accordingly, it is the principal object of the present invention to provide a profiling machine having control means by which the movement of the cutting tool relative to the work is controlled in its direction by a template directly overlying the work.

Another object of the present invention is to provide a profiling machine in which the cutting tool is caused to be moved relative to the work by a power operated mechanism not subject to vibration from the drive of the cutting tool.

Other and further objects of the present invention will become manifest on consideration of the accompanying specification, drawings and claims.

In one embodiment of the present invention, there is provided a profiling machine comprising a carriage, a spindle mounted for rotation on the carriage, a cutting tool mounted on the spindle, and a follower resiliently connected to the carriage. A bed is provided to support a work piece having a relatively flat upper surface, upon which a template is mounted. The follower is adapted to engage the periphery of the template and be urged toward the template with a predetermined force. The follower is connected to the control arm of a tracer mechanism, and the electrical output of the tracer mechanism is connected to drive means adapted to move the spindle relative to the work, in a plane parallel to the surface of the work.

Reference will now be made to the accompanying specification and drawings in which:

FIG. 2 is a rear elevation, partly in section, of the follower and tracer portion of one embodiment of the present invention;

FIG. 3 is a plan view of a portion of the apparatus illustrated in FIG. 2;

FIGS. 4A and 4B are illustrations of alternative forms of follower heads which may be employed with the apparatus of FIG. 2;

FIG. 5 is a rear elevation, partly in section, of the follower and tracer portion of another embodiment of the present invention; a portion of the section being taken along the line 5—5 of FIG. 6;

FIG. 6 is a plan view, partly in section, of the follower portion of the apparatus illustrated in FIG. 5;

FIG. 7 is a plan view of the tracer bar portion of the apparatus illustrated in FIG. 5;

FIG. 8 is a plan (bottom) view, partly broken away, of the follower portion of the apparatus illustrated in FIG. 5;

FIG. 9 is a cross-sectional view of a portion of the apparatus illustrated in FIG. 8, taken along the section 9—9; and FIG. 10 is a functional block diagram of the control system for the drive mechanisms incorporated in the profiling machine of FIG. 1.

Figure 1:
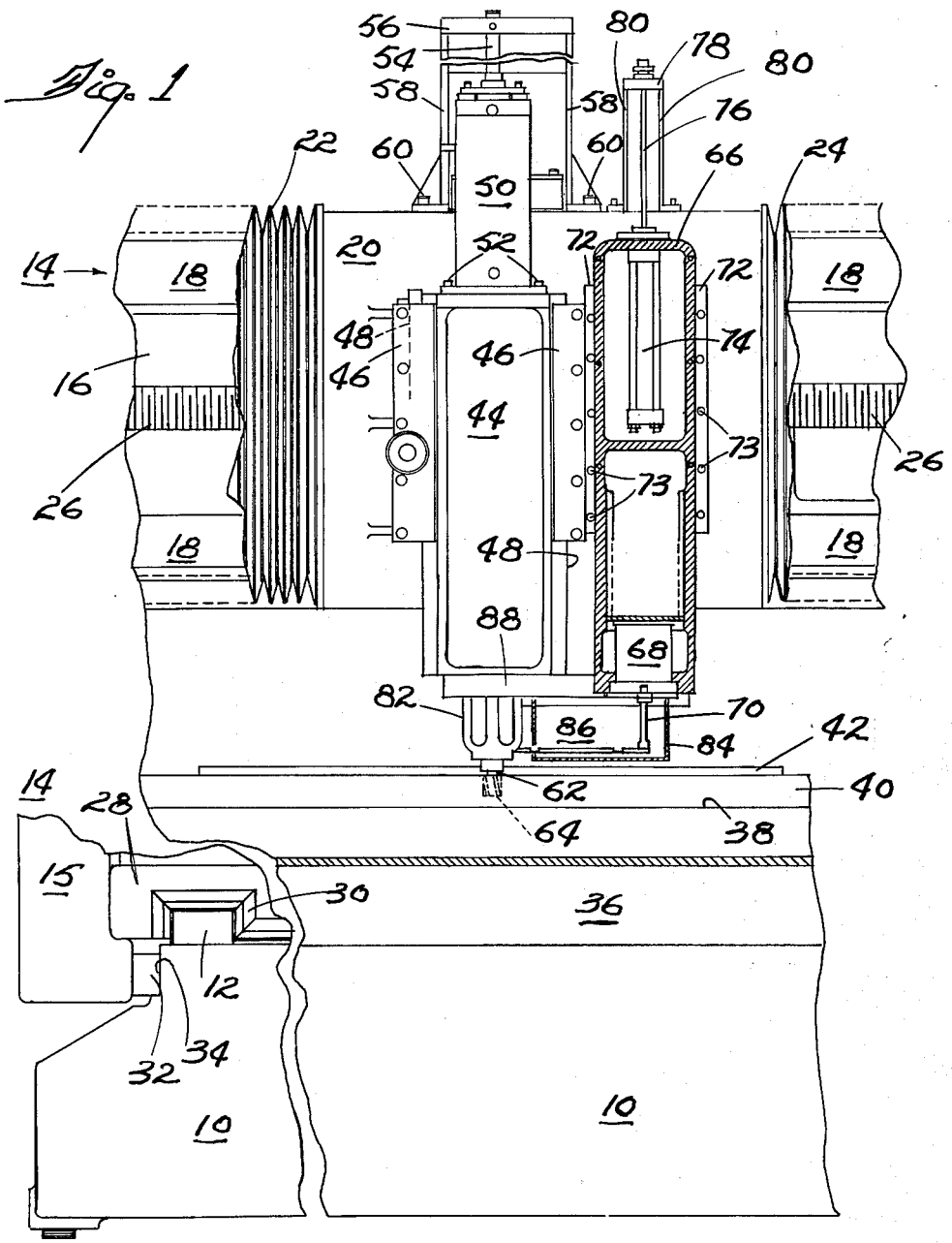
FIG. 1 is a front elevation of a portion of a profiling machine incorporating the present invention.

The profiling machine of FIG. 1 is of a type commonly referred to as a router, comprising a base 10 for supporting a pair of longitudinal ways 12, only one of which is shown, one on each side of the machine, upon which a carriage 14 is slidably mounted. The carriage 14 is preferably of the overhead gantry type, and includes a pair of upright portions 15, only one of which is shown, and which are interconnected by a horizontal transverse section 16 overlying the base 10. A pair of transverse ways 18 are mounted on the horizontal section 16 of the carriage 14, and a saddle 20 is slidably mounted on the ways 18 for transverse movement with respect to the base 10. A bellows 22 is connected at one of its ends to one side of the saddle 20, and at its other end to one of the upright portions 15 of the carriage 14, and a similar bellows 24 is connected between the opposite side of the saddle 20 and the other upright portion (not shown) of the carriage 14. The bellows 22 and 24 serve to prevent dust and other foreign material from lodging on the ways 18, which might prevent smooth movement of the saddle 20 with respect to the ways 18. A screw 26 is rotatably journaled in the upright portions 15 of the carriage 14 and threadably engaged with a portion of the saddle 20, to permit transverse movement of the saddle in response to rotation of the screw 26 in one direction or the other. The screw 26 is rotated by an electric or hydraulic motor, or the like, in response to electrical signals the nature of which will be more fully explained hereinafter.

A pair of members 28, only one of which is shown, are each secured to the lower portion of one of the upright members 15 of the carriage 14, in sliding relationship with the ways 12, and the carriage 14 is supported thereby. A wiper 30 composed of felt or the like is secured to each member 28, surrounding its way 12 in sliding relation therewith, to prevent dirt and dust from interfering with the movement of the carriage 14 in a longitudinal direction. The longitudinal motion of the carriage 14 is preferably imparted by rotation of a second screw (not shown) similar to the screw 26, which second screw is also rotated by an electric or hydraulic motor in response to electrical signals. A sliding member 32 is also provided at the lower extremity of each of the upright portions 15 of the carriage 14, for sliding contact with a pair of surfaces 34 on each side of the base 10, only one of which is shown to prevent transverse shifting of the carriage 14.

A work table 36 is disposed upon the upper surface of the base 10, and the upper surface 38 of the work table 36 will be referred to as the bed of the machine. A work piece 40 is disposed on the bed 38 of the machine, and a template 42 overlies the work, and is secured thereto by a clamp or the like (not shown).

On the saddle 20, a motor 44 is disposed between a pair of vertical ways 46 bolted to the saddle 20 which ways 46 cooperate with vertically disposed machined surfaces 48 connected to the housing of the motor 44 to permit the motor 44 to slide vertically with respect to the ways 46. A hydraulic cylinder 50 is fixed to the upper portion of the housing of the motor 44 by being bolted thereto with a plurality of bolts 52.

The hydraulic cylinder 50 is provided with an interior piston secured to a connecting rod 54 which extends from the upper end of the cylinder 50. The connecting rod 54 is secured to a frame member 56 which in turn is secured to a pair of upright members 58 bolted to the saddle 20 by a plurality of bolts 60. The extension or retraction of the connecting rod 54 with respect to the cylinder 50 is controlled in response to hydraulic pressure furnished by a pump or the like to the interior of the cylinder 50, whereby the motor 44 may be raised and lowered with respect to the bed 38, as desired.

The shaft or spindle 62 of the motor 44 extends vertically downward from the motor 44, and is provided with a cutting tool 64 secured to the lower end thereof. The cutting tool 64 is adapted to be rotated by the motor 44 for removing material from the upper surface of the work piece 40. The depth from which material is removed from the work piece 40 is controlled by the hydraulic cylinder 50, while the movement of the cutting tool 64 in a plane parallel to the bed 38 is controlled by the movement of the carriage 14 longitudinally on the ways 12, and by the movement of the saddle 20 in a transverse direction on the ways 18.

Mounted on the saddle 20 is a second housing 66 in which is disposed a tracer head 68 having a stylus 70 extending downwardly therefrom. The housing 66 is slidable in a vertical direction on a pair of ways 72, bolted to the carriage 20 by a plurality of bolts 73, which ways 72 cooperate with a pair of vertically disposed machined surfaces connected to the housing 66. A hydraulical cylinder 74 is disposed within an upper portion of the housing 66, the cylinder 74 having an internal piston secured to a connecting rod 76 extending upwardly from the housing 66. The end of the connecting rod 76 is secured to a bracket 78 which, in turn, is secured to a pair of vertically extending members 80, the lower portions of which are bolted to the carriage 20. The hydraulic cylinder 74 permits the housing 66 to be raised and lowered with respect to the bed 38 independently of the motor 44. Inasmuch as the motor 44 and the housing 66 are both mounted on the saddle 20, however, the tracking system by which the carriage 14 moves with respect to the ways 12 and the saddle 20 moves with respect to the ways 18, moves the motor 44 and the housing 66 together in a plane parallel to the bed 38.

A follower 82 surrounds the spindle 62 at a position above the cutting tool 64, and is adapted to cooperate with an edge of the template 42 which overlies the work piece 40. The follower 82 is resiliently mounted to a member 88 which is secured to and extends horizontally from the housing 66, so that the position of the follower 82 with respect to the housing 66 is not fixed, but is variable within the limits of the resilient connection between the member 88 and the follower 82. A link member 86 is connected between the follower and the stylus 70. A cover 84 is connected to the lower portion of the housing 66, and shields the link member 86 and the stylus 70 of the tracer head 68 from stray forces such as may be produced by air currents or the like. The resilient connection of the follower 82 with the member 88 is such as to permit only a slight pivot movement with respect to the member 88. The link 86 permits this movement to be transmitted to the stylus 70 of the tracer head 68, and the tracer head 68 responds to movement of the stylus 70 to produce electrical signals which control tracking of the machine in two directions along the ways 12 and 18.

Referring to FIG. 10, a functional block diagram of the tracking control system of the router of FIG. 1 is illustrated, in which the tracer head 68 is shown as a dashed rectangle including a pair of means 90 and 92, which respectively respond to movement of the stylus 70 of the tracer head 68 in two directions parallel to the bed 38, and arbitrarily referred to as X and Y directions, respectively. The means 90 and 92 are arbitrarily illustrated as two separate means, but may be any unit which produces, in effect, two output signals. Of the two directions indicated as X and Y, one is the direction parallel to the ways 12, while the other is the direction parallel to the ways 18. The means 90 and 92 each produce an output which is proportional to the movement or deflection of the stylus 70 in its direction. The outputs from the means 90 and 92 are connected to a tracking control device 94, which controls a pair of motors 96 and 98 associated with the drive screws for the X and Y directions. The control signals applied from the control unit 94 to the motors 96 and 98 are in the form of error signals and are of the appropriate magnitude and sign to cause one or both of the motors 96 and 98 to rotate in such a way as to reduce the error detected by the means 90 and 92.

The stylus 70 of the tracer head 68 is preferably adapted to be normally deflected by a predetermined amount, to insure that the periphery of the follower 82 is actually in contact with the edge of the template 42. The control device 94 therefore responds to signals derived from the means 90 and 92 which are representative of a deflection corresponding to a greater-than-normal or a lesser-than-normal force acting between the template 42 and follower 82 to deflect the stylus 70. The predetermined normal deflection of the stylus 70 is represented by a reference signal 100, connected to the control device 94.

The tracking system is preferably designed to track at a predetermined number of inches per minute depending on the composition of the work piece. The signals applied to the motors 96 and 98 are such that the sum of their squares is a constant value. The motors 96 and 98 will therefore cause tracking in a direction parallel to the edge of the template 42 at a substantially constant speed, while urging the follower 82 toward the template 42 with a predetermined force.

The control system illustrated in FIG. 10 is the customary arrangement normally provided for tracking of the drive mechanisms of milling machines and the like, and is therefore not specifically described.

Referring now to FIG. 2, there is illustrated a rear elevation, partly in section, of the follower and tracer portion of the apparatus illustrated in FIG. 1. The tracer head 68 is resiliently mounted in the housing 66 to insulate the tracer head 68 from shocks which may accompany the removal of material from the work 40 by the cutting tool 64. Such shock mountings are well understood by those skilled in the art. The stylus 70 of the tracer head extends centrally through an aperture 102 disposed in the bottom of the housing 66, and is bolted at its end 104 to a relatively flat plate 106 by a bolt 108 threadably engaged in a bore in the stylus 70.

The plate 106 is bolted to one end of a strip 110 of leaf spring material, such as beryllium copper or the like, the other end of which is bolted to one end of a tracer bar 112. The other end of the tracer bar 112 is bolted to a second strip 114 of leaf spring material, the other end of such strip 114 being riveted to the follower 82. The strip 114 passes freely through an aperture 116 in the end wall of the cover 84.

The member 88 is connected integrally with the housing 66, and is provided with a circular aperture 118 in which the follower 82 is disposed. An annular sheet 120 of spring material such as beryllium copper or the like is bolted at a plurality of locations around the periphery of the aperture 118 by bolts 122 which serve to hold the periphery of the sheet 120 securely in fixed relation to the member 88. In order to equalize the force holding the sheet 120 to the member 88, at all locations around its periphery, a ring 124 is preferably disposed between the sheet 120 and the heads of the bolts 122.

The sheet 120 is provided with a central circular aperture 126 axially aligned with the aperture 118, and the periphery of the aperture 126 is clamped to a flange 128 extending outwardly from the upper end of the follower 82. A ring 130 is bolted to the flange 128 at a plurality of locations around the periphery of the aperture 126, with a plurality of bolts 132, and the sheet 120 is thereby securely fixed to the upper extremity of the follower 82 and supports the follower 82 in resilient relation with respect to the member 88.

The follower 82 is provided with a plurality of downwardly extending ribs 134 integral with the flange 128, thereby to form a cage or basket surrounding the spindle 62 and the lower portion 136 of the motor 44. The lower ends of the ribs 134 are integral with a web 138, which is disposed parallel to the plane of the bed 38, and which is provided with a centrally disposed circular aperture 140. A hollow follower head 142 is adapted to be disposed in the aperture 140 in a position surrounding the spindle 62, and is bolted to the ring 138, at a plurality of locations by bolts 144. The following surface comprises hollow right circular cylinder 143 which extends downwardly from the body of the follower head 142, and its outside surface is accurately concentrically aligned with the spindle 62, which passes therethrough.

In FIGS. 4A and 4B, there are illustrated two alternative follower heads 142' and 142'', which may be substituted for the follower head 142, for use with cutting tools of different diameters, or to vary the size of a pattern cut by a single cutting tool.

The follower head 142 is provided with a circular, ring-shaped recess 154 surrounding the body portion of the follower head 142. The web 138 is provided with a bore 146 adapted to receive a fitting 148 to which a hose 150 is connected. The recess 154 connects with the bore 146 in the web 138, to permit fluid from the hose 150 to enter the chamber bounded by the recess 154 and the web 138, when the follower head 142 is disposed in operative position with respect to the web 138. The hose 150 is formed of thin, lightweight material and is supported from a bracket (not shown) mounted on the member 88, so that the weight of the hose 150 does not disturb the accuracy of the deflection of the follower 82. A plurality of downwardly and inwardly extending bores 156 connect the recess 154 with the interior of the follower cylinder 143 such that the fluid introduced by the hose 150 is directed toward the cutting tool 64 so as to lubricate and cool the cutting tool 64. The preferred fluid employed with the hose 150 is a mixture of liquid and air of relatively light density, so that the weight of the fluid in the hose 150 does not disturb the accuracy of the follower head 82.

The outside surface 145 of the follower cylinder 143 is adapted to bear on the edge of the template 42, such that the follower 82 is deflected with respect to the spindle 62 by a force acting between the template 42 and the follower cylinder 143 of the follower head 142. As has been described above, this force causes deflection of the stylus 70 of the tracer head 68 to permit tracking of the saddle 20 in a manner determined by the contour of the template 42. The annular sheet spring 120 resiliently couples the follower 82 with the member 88 to permit the follower 82 to deflect in response to the force acting between the template 42 and the follower head 142. Its axially symmetric shape permits it to deflect a constant amount per unit force, irrespective of the direction of the force.

The leaf springs 110 and 114 which are connected to the tracer bar 112 enable the bar 112 to transmit the movement of the follower 82 to the tracer head 68 without distortion as the stylus swings in an arc about a pivot within the tracer head 68. The attitude of the stylus 70 is substantially vertical when no load is acting on the follower 82, and so a force acting on the follower 82 in any direction produces an equal deflection or swing of the stylus 70. The leaf springs 110 and 114 deflect to accommodate the slight upward movement of the end of the stylus 70 as it swings from its vertical position. The linkage is free of backlash, since none of the parts of the linkage move with respect to each other.

Referring now to FIGS. 5 to 9, there is illustrated another embodiment of the present invention employing a different construction of follower head and a different construction of linkage interconnecting the follower with the tracer head 68. As illustrated in FIG. 5, the follower 82 comprises an upper portion 158 in threadable relation with a lower section or follower head 160. A follower cylinder 161 is mounted in an aperture of the follower head 160, and extends downwardly. A bore 163 is connected to a recess within the follower head 160 to accommodate lubricating fluid, which is then directed toward the cutting tool.

The upper portion 158 is provided with a circular flange 162 extending outwardly therefrom in a plane parallel to the bed 38. The upper and lower surfaces of the flange 162 are accurately machined and are supported in a ball bearing assembly comprising a plurality of balls 164 which are maintained in position by a pair of rings 166 and 168 having apertures for receiving the balls 164 and maintaining them in spaced relation around the periphery of the flange 162. The balls 164 disposed in the upper ring 168 cooperate with an upper surface 170 of a recess disposed in the lower portion of the member 88, while the balls 164 associated with the lower ring 166 cooperate with an annular plate 172 bolted to the member 88 in overlapping relation with the recess by a plurality of bolts 174.

A plurality of radially extending bores 174 are drilled into an upstanding boss 178, projecting upwardly from the member 88. In each of the bores 174 a plunger 180 is disposed and is forced by a spring 182 inwardly with respect to the axis 176, against the outer periphery of the upper portion 158 of the follower. Each of the springs 182 forces the follower 82 inwardly with a predetermined force such that when no external force is acting on the follower 82, it is centrally disposed with respect to each of the plungers 180 and is therefore axially aligned with respect to the axis of the spindle 62. The springs 182 serve to resiliently support the follower 82 with respect to the member 88, and adapt it for movement in a plane parallel to the bed 38. A ring 192 surrounds the periphery of the boss 178, to retain the springs 182 in position.

The follower 82 is prevented from rotating with respect to the member 88 about the axis 176 by a pair of transverse keyways 184 and 186 (FIGS. 8 and 9) disposed in perpendicular relation, on opposite sides of the member 88. Each of the keyways 184 and 186 is provided with a key 185 and 188 in slidable relation with its respective keyway. The keyway 184 permits the follower 82 to shift with respect to the member 88 in one direction, while the keyway 186 permits the follower 82 to shift with respect to the member 88 in a second transverse direction. The keyway 184 is partly disposed in the flange 162 of the upper follower portion 158, and partly within a block 190 mounted in a recess 191 disposed in the lower surface of the member 88. The keyway 186 is partly disposed in the lower surface of the block 190, and partly in the upper surface of the annular plate 172. The dimensions of the block 190 are slightly less than those of the recess 191, to permit the block 190 to slide with respect to the member 88 and the plate 172 when the follower 82 moves in a direction parallel to the keyway 188. When the follower 82 moves in the transverse direction, the key 185 slides in its keyway 184.

A spring biased plunger 194 is adapted for selectively holding the upper portion 158 of the follower 82 in fixed position when the follower head 160 is to be removed. The plunger 194 is aligned with a recess in the upper portion 158 of the follower 82. The plunger 194 is provided with a head 196, and a spring 198 is disposed between the head 196 and a block 200 mounted on the bottom of the member 88, and secured thereto by bolts 202. A recess 204 is provided near the radially inward end of the plunger 194, and a set screw 206 is adapted to engage the recess 204, the set screw 206 being threadably engaged in a bore 208 within the block 200. The plunger 194 is normally held out of engagement with the upper portion 158 of the follower 82, by the spring 198. When it is desired to change the follower head 160 to one of a different size, however, the plunger is pushed inwardly to engage with a recess 205 in the upper portion 158 of the follower 82, to hold the upper portion 158 in fixed relation while the follower head 160 is unscrewed from engagement with the upper portion 158. Thus, the plunger 194 takes the load of unscrewing the follower head 160, and prevents damage to the keyways 184 and 186 and their respective keys 185 and 188.

The follower 82 is connected to the stylus 70 of the tracer head 68 by a linkage connected to a ring 210 which surrounds the upper portion 158, the link comprising a pair of bars 212 extending toward the stylus 70. The bars 212 are secured to the ring 210 at one end by welding or the like, and to a brace member 214 at the other end. The brace member 214 is provided with a threaded bore to receive a threaded shaft 216, which is connected to a universal joint 218. A nut 219 is also threaded on the shaft 216 to hold the shaft 216 in fixed relation to the brace member 214.

The universal joint 218 is of the ball and socket variety, the ball member 221 having a spherical surface, and the fitting 216 being connected to an outer socket ring 220 which has an interior spherical surface matching with the exterior surface of the ball member 221. The end of the spindle 70 is machined to form a shaft 223 which slidably fits into a bore centrally disposed in the ball member 221. Longitudinal movement of the link including bars 212 therefore enables the stylus 70 to swing about an axis transverse to the bars 212, while movement of the follower 82 and the bars 212 in a direction transverse to the bars 212 imparts a corresponding swinging motion to the stylus 70. Therefore, when the follower 82 is moved with respect to the tracer head 68 in any direction in a plane parallel to the bed 38, the tracer head 68 responds to the resulting movement of its stylus to control the machine tracking in the appropriate direction. A block 225 is bolted to a portion of the member 88 to maintain the bars in a horizontal attitude.

It will be appreciated that the control unit 94 of the machine tracking system is adapted to respond to the signals derived from the X and Y sensing means 90 and 92 to cause the machine to track so that the follower 82 (along with the cutting tool) is moved in a direction tangent to the surface of the template at the point of contact with the follower, while also moving in such a way as to continuously present a predetermined force between the template and the follower. It is preferred that the predetermined force acting on the template is small, on the order of eight pounds, so that the templates may be formed of thin sheets of material which are relatively weak structurally, and errors are not introduced by compression of the template material.

By use of a follower having an exterior following surface which is concentric with the axis of the spindle, the machine may be caused to track in a closed loop, if desired, in order to remove material from either the inside or outside of the edge of the template which is being tracked. Thus the present invention may be employed with templates in the form of relatively flat sheets of material having interior apertures provided therein, as well as with templates in the form of silhouettes of the desired patterns. One advantage of the present invention is realized in permitting a plurality of templates to be mounted over the work piece in the form of a single template sheet having a plurality of apertures therein. It will be appreciated that the use of a single template sheet having a plurality of individual template patterns facilitates securing the templates to the upper surface of the work piece, since only one sheet rather than a plurality of individual templates need be thus secured.

Without further elaboration, the foregoing will so fully and completely describe the present invention as to enable those skilled in the art, by applying current knowledge, to adapt the same for varying conditions of service, without departing from the essential features of novelty involved, which are intended to be defined and secured by the following claims.

What is claimed is:

1. A profiling machine having a bed for supporting a work piece, a carriage adapted for movement in a longitudinal direction parallel to said bed, a saddle supported on said carriage, said saddle being adapted for movement in a transverse direction parallel to said bed, a spindle mounted on said saddle adapted for motion in a direction normal to said bed, drive means mounted on said saddle for rotating said spindle, a tracer head mounted on said saddle, said tracer head having a stylus and responsive to movement of said stylus to control the movement of said spindle in a plane parallel to said bed, a temperate mounted on said work piece, follower means resiliently mounted on said saddle and adapted to be urged into contact with said template, and link means connecting said follower to said stylus to control said movement in said plane in accordance with the template contour.

2. Apparatus according to claim 1, wherein said link means comprises a tracer bar connected to said follower, and a universal joint connected to said tracer bar and cooperating with said stylus.

3. Apparatus according to claim 1, wherein said tracer head and said spindle are adapted for independent movement in a direction normal to the bed, whereby said follower may be brought into engagement with said template before said cutting tool is brought into engagement with said work piece.

4. Apparatus according to claim 1, wherein said means for resiliently mounting said follower on said carriage comprises a leaf spring in the form of a disk having a central aperture, said follower being connected to said leaf spring adjacent said aperture, and the outer periphery of said leaf spring being connected to said carriage.

5. Apparatus according to claim 1, wherein said tracer head is responsive to movement of said stylus in two dimensions to control movement of said spindle in two corresponding directions.

6. Apparatus according to claim 5, wherein said stylus is adapted to be reflected by said tracer bar in a first direction normal to the surface of said follower at the point of contact of said follower with said template, said spindle and saddle being adapted for movement parallel to said first direction until said stylus is deflected a predetermined amount, said spindle and saddle being adapted for movement in a second direction perpendicular to said first direction at a preselected speed.

7. Apparatus according to claim 1, wherein said follower comprises a hollow body of revolution having an outer surface concentric with said spindle, said follower being supported from said saddle to permit said spindle to extend through said follower, whereby said outer surface of said follower is displaced from the outer surface of said cutting tool by a predetermined distance.

8. Apparatus according to claim 7, wherein said follower is provided with an annular internal chamber surrounding said spindle, means for introducing fluid into said chamber, and a plurality of discharge ports for allowing said fluid to discharge from said chamber toward said spindle.

9. Apparatus according to claim 1, wherein said link means comprises a tracer bar and a pair of leaf springs, one of said leaf springs being interposed between said follower and said tracer bar, and the other said springs being interposed between said tracer bar and said stylus.

10. Apparatus according to claim 9, wherein said tracer bar comprises a bar of rectangular cross section having its larger dimension disposed parallel to said bed.

11. Apparatus according to claim 9, wherein said tracer bar is connected to said tracer control arm by a leaf spring comprising a relatively flat strip of resilient material oriented generally parallel to the bed, and connected to said tracer bar at a plurality of places and to said stylus at a plurality of places to prevent rotation of said tracer bar about a vertical axis normal to said bed.

12. In a profiling machine having power operated means for moving a carriage relative to a work piece, and cutting tool means mounted on said carriage, the combination comprising a template mounted directly on the surface of said work piece, a tracer head having a stylus and adapted to control said moving means in response to a force imparted to said stylus, a follower resiliently mounted on said carriage and having a surface for engaging said template, and means for connecting said follower to said stylus to cause said moving means to move such cutting tool in accordance with the contour of said template.

13. Apparatus according to claim 12, including means for mounting said follower to said carriage comprising a thin, flexible, annular leaf spring, whereby substantially equal resistance to deflection of said follower is provided in any direction.

14. In a profiling machine having power operated means for moving a cutting tool relative to a work piece, the combination comprising a template mounted directly on a surface of said work piece, a tracer head having a stylus and adapted to control said moving means in response to force imparted to said stylus, a follower having a surface for engaging said template, and link means for connecting said follower to said stylus means to move said cutting tool in accordance with the contour of said template, said link means being relatively rigid in a plane parallel to the surface of said work piece, and relatively flexible in a direction normal thereto.

References Cited by the Examiner

UNITED STATES PATENTS

| | | | |
|---|---|---|---|
| 2,234,320 | 3/1941 | Rosen | 90—62 |
| 2,546,692 | 3/1951 | Greene et al. | 90—62 X |
| 2,723,598 | 11/1955 | Mann | 90—13.5 |
| 2,734,428 | 2/1956 | Onsrud | 90—62 X |
| 2,826,966 | 3/1958 | Lamielle | 90—62 |
| 2,973,695 | 3/1961 | Schmid | 90—62 X |

WILLIAM W. DYER, JR., *Primary Examiner.*

LEON PEAR, *Examiner.*